United States Patent
Schoonover et al.

(10) Patent No.: US 8,726,501 B2
(45) Date of Patent: May 20, 2014

(54) METHOD OF WELDING SINGLE CRYSTAL TURBINE BLADE TIPS WITH AN OXIDATION-RESISTANT FILLER MATERIAL

(75) Inventors: Jeffrey Jon Schoonover, Delmar, NY (US); Magdi Naim Azer, Niskayuna, NY (US); Warren Martin Andre Miglietti, Jupiter, FL (US)

(73) Assignee: General Electric Company, Niskayuna, NY (US)

( * ) Notice: Subject to any disclaimer, the term of this patent is extended or adjusted under 35 U.S.C. 154(b) by 1297 days.

(21) Appl. No.: 12/550,869

(22) Filed: Aug. 31, 2009

(65) Prior Publication Data

US 2011/0052386 A1 Mar. 3, 2011

(51) Int. Cl.
*B23P 6/00* (2006.01)

(52) U.S. Cl.
USPC .... 29/889.1; 228/119; 228/248.1; 29/402.01; 29/402.18; 29/402.21

(58) Field of Classification Search
USPC ............... 29/889.1, 402.18, 402.21; 228/119
See application file for complete search history.

(56) References Cited

U.S. PATENT DOCUMENTS

| | | | | |
|---|---|---|---|---|
| 5,584,663 A * | 12/1996 | Schell et al. | ............ | 416/241 R |
| 5,622,638 A * | 4/1997 | Schell et al. | ............ | 219/121.64 |
| 5,735,044 A * | 4/1998 | Ferrigno et al. | ............ | 29/889.1 |
| 5,794,338 A * | 8/1998 | Bowden et al. | ............ | 29/889.1 |
| 5,822,852 A | 10/1998 | Bewlay et al. | | |
| 5,846,057 A * | 12/1998 | Ferrigno et al. | ............ | 416/241 R |
| 5,897,801 A * | 4/1999 | Smashey et al. | ............ | 219/137 WM |
| 6,084,196 A * | 7/2000 | Flowers et al. | ............ | 219/121.46 |
| 6,103,402 A * | 8/2000 | Marcin et al. | ............ | 428/637 |
| 6,302,649 B1 * | 10/2001 | Mukira et al. | ............ | 415/200 |
| 6,332,272 B1 * | 12/2001 | Sinnott et al. | ............ | 29/889.1 |
| 6,588,103 B2 * | 7/2003 | Fernihough et al. | ............ | 29/889.1 |
| 6,908,288 B2 * | 6/2005 | Jackson et al. | ............ | 416/224 |
| 6,994,920 B2 * | 2/2006 | Trewiler | ............ | 428/670 |
| 7,165,325 B2 * | 1/2007 | Imano et al. | ............ | 29/889.1 |
| 7,278,829 B2 * | 10/2007 | Roedl et al. | ............ | 416/223 R |
| 7,587,818 B2 * | 9/2009 | Gorman et al. | ............ | 29/889.1 |
| 2002/0187044 A1* | 12/2002 | Lee et al. | ............ | 416/97 R |
| 2005/0091847 A1* | 5/2005 | Beneteau et al. | ............ | 29/889.1 |
| 2005/0091848 A1* | 5/2005 | Nenov et al. | ............ | 29/889.1 |
| 2005/0241147 A1* | 11/2005 | Arnold et al. | ............ | 29/889.1 |
| 2006/0137179 A1* | 6/2006 | Gorman et al. | ............ | 29/889.1 |
| 2006/0174482 A1 | 8/2006 | Roedl et al. | | |
| 2009/0123290 A1* | 5/2009 | Imano et al. | ............ | 416/241 R |

FOREIGN PATENT DOCUMENTS

EP 05815747 A 2/1994

OTHER PUBLICATIONS

GB1013946.7 Search Report, Nov. 29, 2010.

* cited by examiner

*Primary Examiner* — David Bryant
*Assistant Examiner* — Jason L Vaughan
(74) *Attorney, Agent, or Firm* — John P. Darling

(57) ABSTRACT

A method for depositing material on a turbine airfoil having a tip wall extending past a tip cap, wherein the tip wall includes a first alloy with a single crystal microstructure. The method includes: depositing a second alloy on at least a portion of the tip wall to form a repair structure, wherein a high temperature oxidation resistance of the second alloy is greater than a high temperature oxidation resistance of the first alloy, and wherein the repair structure has a crystallographic orientation that is substantially the same as a crystallographic orientation of the tip wall.

13 Claims, 5 Drawing Sheets

METHOD OF WELDING SINGLE CRYSTAL TURBINE BLADE TIPS WITH AN OXIDATION-RESISTANT FILLER MATERIAL

BACKGROUND OF THE INVENTION

This invention relates generally to the repair of gas turbine engine components and more particularly to the repair of tip structures for turbine airfoils.

Turbine blades for gas turbine engines are commonly fabricated from hollow castings of nickel- or cobalt-based "superalloys" having a single crystal microstructure for high-temperature strength and fatigue resistance. Cast turbine blades often include a structure known as a "squealer tip". A squealer tip is a relatively small extension, having a cross-sectional shape conforming to that of the turbine blade, either integral with or mounted on the radially outer end of the turbine blade. The utilization of squealer tips on turbine blades can effectively reduce the disadvantageous effects of rubbing between turbine blades and the shroud.

Turbine blades are subject to high operating temperatures in an oxidizing gas environment. In service, their tips often fail due to oxidation and thermal mechanical fatigue. When this occurs, the tips are often repaired between service intervals rather than replacing the entire blade. Known repairs of turbine blade tips involve welding at elevated temperatures with the plasma arc or gas tungsten arc (GTA) welding process, using a filler material that has high ductility so weld cracking is minimized. However, the weld repair buildup from this process is polycrystalline in nature and not single crystal. It therefore does not have the same thermal fatigue resistance as the original turbine blade.

BRIEF SUMMARY OF THE INVENTION

These and other shortcomings of the prior art are addressed by the present invention, which provides a method for repairing a tip of an airfoil which provides a repaired area having enhanced high-temperature oxidation resistance as well as high thermal fatigue resistance.

According to an aspect of the invention, a method is provided for depositing material on a turbine airfoil having a tip wall extending past a tip cap, wherein the tip wall includes a first alloy with a single crystal microstructure. The method includes: depositing a second alloy on at least a portion of the tip wall to form a repair structure, wherein a high temperature oxidation resistance of the second alloy is greater than a high temperature oxidation resistance of the first alloy, and wherein the repair structure has a crystallographic orientation that is substantially the same as a crystallographic orientation of the tip wall.

According to another aspect of the invention, a method is provided for replacing a tip wall on a turbine airfoil, wherein the turbine airfoil includes a tip wall extending past a tip cap, and wherein the turbine airfoil includes a first alloy with a single crystal microstructure. The method includes: removing the tip wall from the turbine airfoil; and depositing a second alloy on the tip cap to form a replacement tip wall, wherein a high temperature oxidation resistance of the second alloy is greater than a high temperature oxidation resistance of the first alloy, and wherein the replacement tip wall has a crystallographic orientation that is substantially the same as a crystallographic orientation of the turbine airfoil.

According to another aspect of the invention, a method is provided for forming a tip wall on a turbine airfoil, wherein the turbine airfoil includes a tip cap, and wherein the airfoil includes a first alloy with a single crystal microstructure, the method comprising: depositing a second alloy on the tip cap to form a tip wall, wherein a high temperature oxidation resistance of the second alloy is greater than a high temperature oxidation resistance of the first alloy, and wherein the tip wall has a crystallographic orientation that is substantially the same as a crystallographic orientation of the turbine airfoil.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
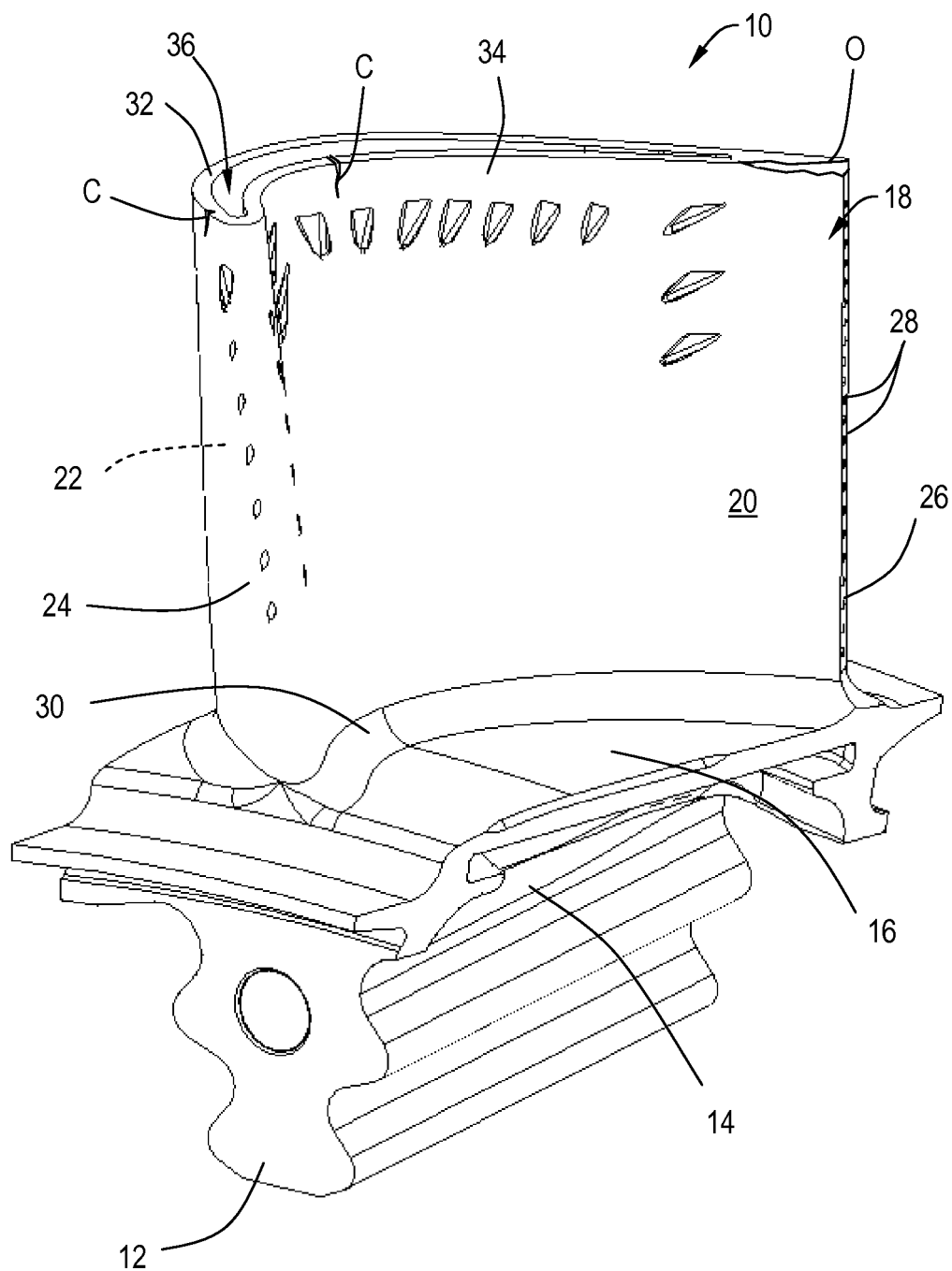
FIG. 1 is a perspective view of an exemplary turbine blade.
Figure 2:
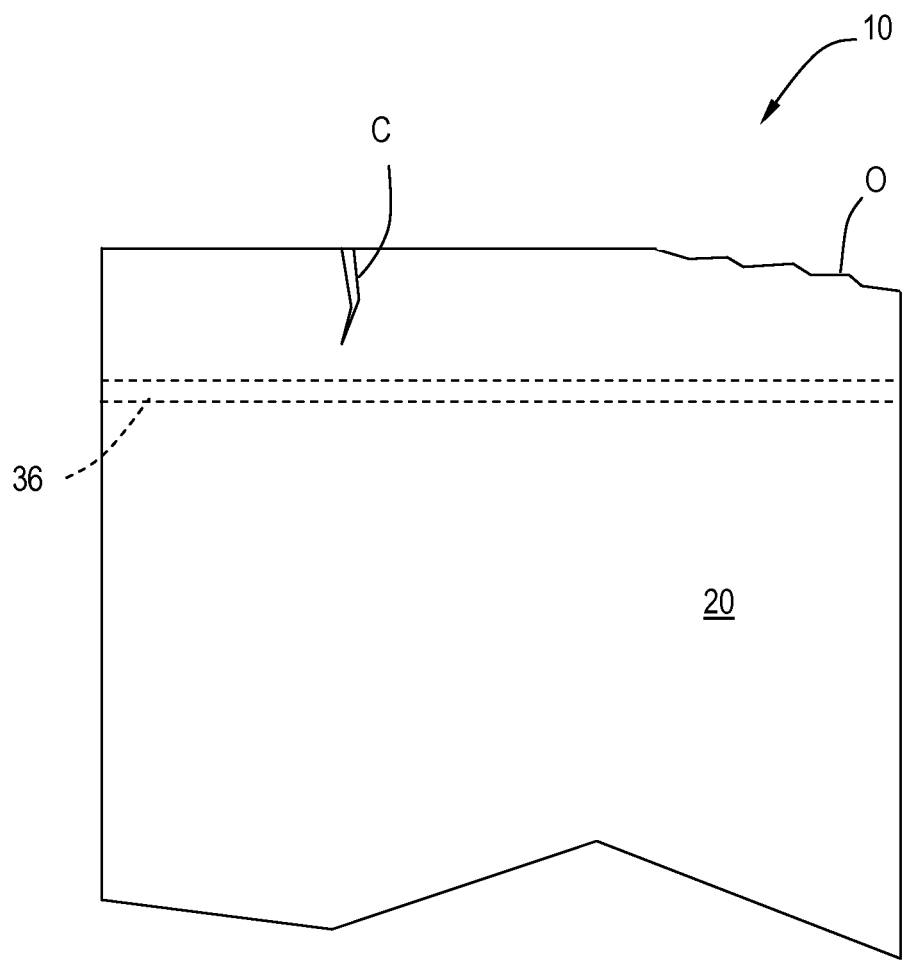
FIG. 2 is a schematic, side elevational view of a portion of the turbine blade of FIG. 1 before repair.

Referring to the drawings wherein identical reference numerals denote the same elements throughout the various views, FIGS. 1 and 2 illustrate an exemplary turbine blade 10. The turbine blade 10 includes a conventional dovetail 12, which may have any suitable form including tangs that engage complementary tangs of a dovetail slot in a rotor disk (not shown) for radially retaining the blade 10 to the disk as it rotates during operation. A blade shank 14 extends radially upwardly from the dovetail 12 and terminates in a platform 16 that projects laterally outwardly from and surrounds the shank 14. A hollow airfoil 18 extends radially outwardly from the platform 16. The airfoil 18 has an outer wall comprising a concave pressure side outer wall 20 and a convex suction side outer wall 22 joined together at a leading edge 24 and at a trailing edge 26. The trailing edge 26 may incorporate trailing edge cooling passages such as the illustrated holes 28. The airfoil 18 has a root 30 and a tip 32. The radially outermost portion of the airfoil 18 defines a peripheral tip wall 34, sometimes referred to as a "squealer tip". A tip cap 36 closes off the interior of the airfoil 18 and lies recessed a small distance radially inward from the tip 32. The airfoil 18 may take any configuration suitable for extracting energy from the hot gas stream and causing rotation of the rotor disk. The blade 10 is preferably formed as a one-piece casting of a suitable "superalloy" of a known type, such as a nickel-based superalloy (e.g., Rene 80, Rene 142, Rene N4, Rene N5) which has acceptable strength at the elevated temperatures of operation in a gas turbine engine. The blade 10 is be formed with a selected crystalline microstructure, such as single-crystal ("SX").

The interior of the turbine blade 10 is mostly hollow and includes a number of internal cooling features of a known type, such as walls defining serpentine passages, ribs, turbulence promoters ("turbulators"), etc. While the turbine blade 10 is a high pressure turbine blade, the principles of the present invention are applicable to any type of turbine airfoil.

In operation, the turbine blade 10 is subject to a flow of high-temperature combustion gases that constitute an oxidizing environment. After a period of service, this results in defects such as fatigue cracks, examples of which are shown at "C", and material loss from oxidation, examples of which are shown at "O" (See FIG. 2).

The initial step in repairing such defects of the tip repair method is to strip the tip 32 of any coating materials (such as corrosion or thermal resistant coatings) that may be present. The coating material may be stripped using any suitable technique, such as grit blasting, chemical baths, and the like, or by a combination of such techniques. After stripping, the tip 32 may be cleaned, if necessary, using a process such as fluoride ion cleaning.

Figure 3:
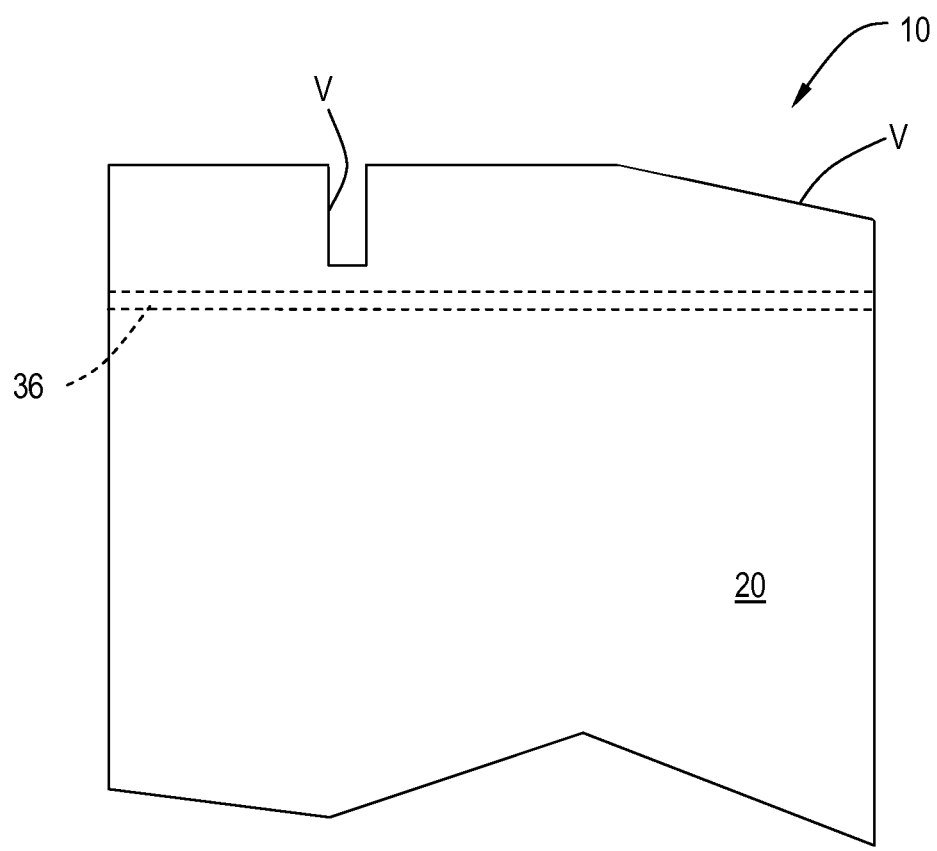
FIG. 3 is a schematic, side elevational view of a portion of the turbine blade of FIG. 3 after a cleaning and preparation step.

Next, any damaged portions are cut or dressed out as necessary to remove any foreign materials from the defects, and provide a void "V" in each defect location having a clean faying surface and adequate access for subsequent repair. This may be accomplished using a variety of techniques, including but not limited to, machining techniques, such as grinding and cutting. For certain applications, one or more layers may be removed from the tip wall. For other applications, one or more selected regions are removed from the tip wall. The result of this step is shown in FIG. 3.

Figure 4:
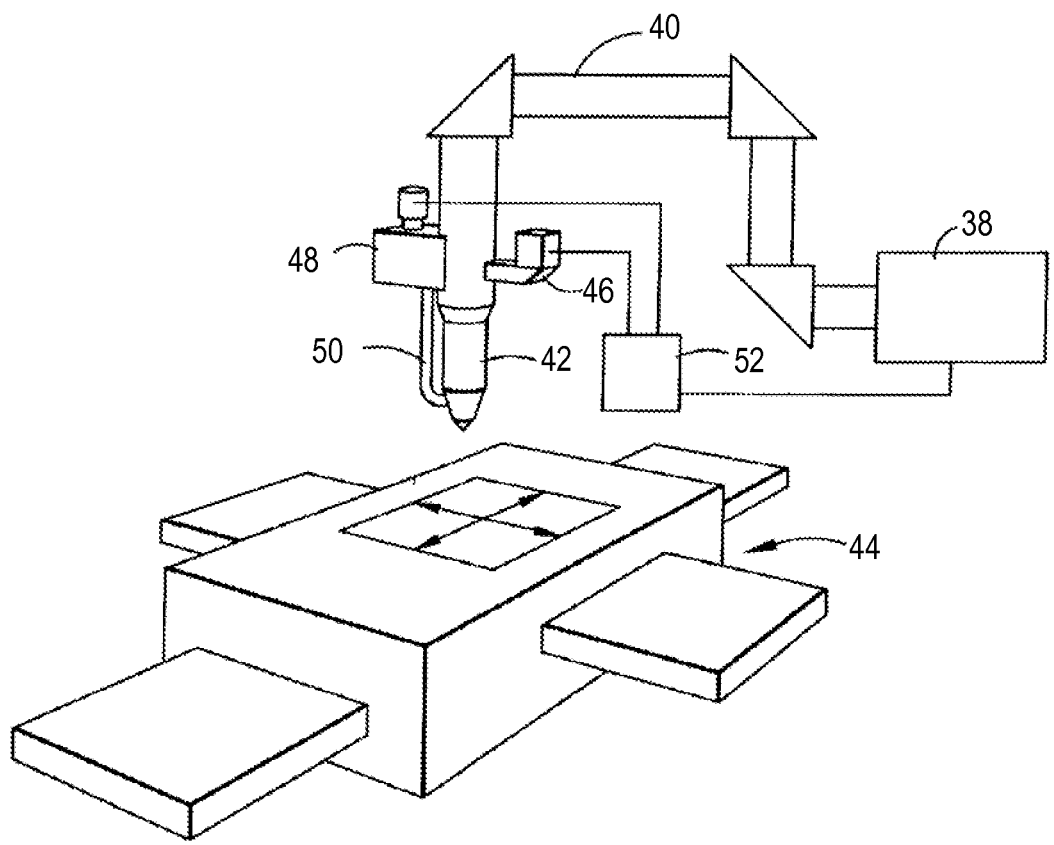
FIG. 4 is a schematic view of a laser welding apparatus.

Next, the voids V are filled using laser welding. An example of a suitable apparatus for laser welding is disclosed in U.S. Pat. No. 5,622,638 to Schell et al., assigned to the assignee of this invention, and is schematically illustrated in FIG. 4. The apparatus includes a laser 38, an enclosed beam delivery conduit 40, laser focusing optics 42, a part positioning system 44, a vision system 46 for part location and laser path control, an optional preheat box (not shown), and a powder feed system 48 with a powder tube 50. The working and coordination of the individual parts of the apparatus are controlled through a computerized system controller 52.

Using the apparatus shown in FIG. 4, molten alloy powder is deposited in the voids V in one or more passes. Alternatively, powder can be deposited and then heated to melt and fuse it to the tip wall 34, or the filler alloy could be provided in the form of a wire. Preferably, the powder alloy composition is a material with better resistance to oxidation at high temperatures than the base alloy of the airfoil 18. One non-limiting example of a suitable powder composition is a nickel-based alloy having an approximate composition, in weight percentages, is as follows: 0.01-0.03 C, 7.4-7.8 Cr, 2.9-3.3 Co, 5.3-5.6 Ta, 7.6-8.0 Al, 3.7-4.0 W, 0.01-0.02 B, 0.12-0.18 Hf, 1.5-1.8 Re, 0.5-0.6 Re, balance Ni and incidental impurities.

The exact process parameters may vary to suit a specific application. for example, the laser beam may be operated continuously or pulsed at any frequency, and the laser duty cycle may be 0-100%. Laser power could be from about 50 W to about 1200 W. Laser wavelength may be from about 0.01 to about 100 microns. Translation speed may be about 0.01 cm/s to about 100 cm/s. Powder feed rate may be from about 0.1 g/min. to about 10 g/min. In the illustrated example, a pulsed laser beam is used, with a peak power of 200 W, pulse frequency of 5 Hz, and a 50% duty cycle. The translation speed is approximately 0.57 cm/s (0.225 in./s)

Figure 5:
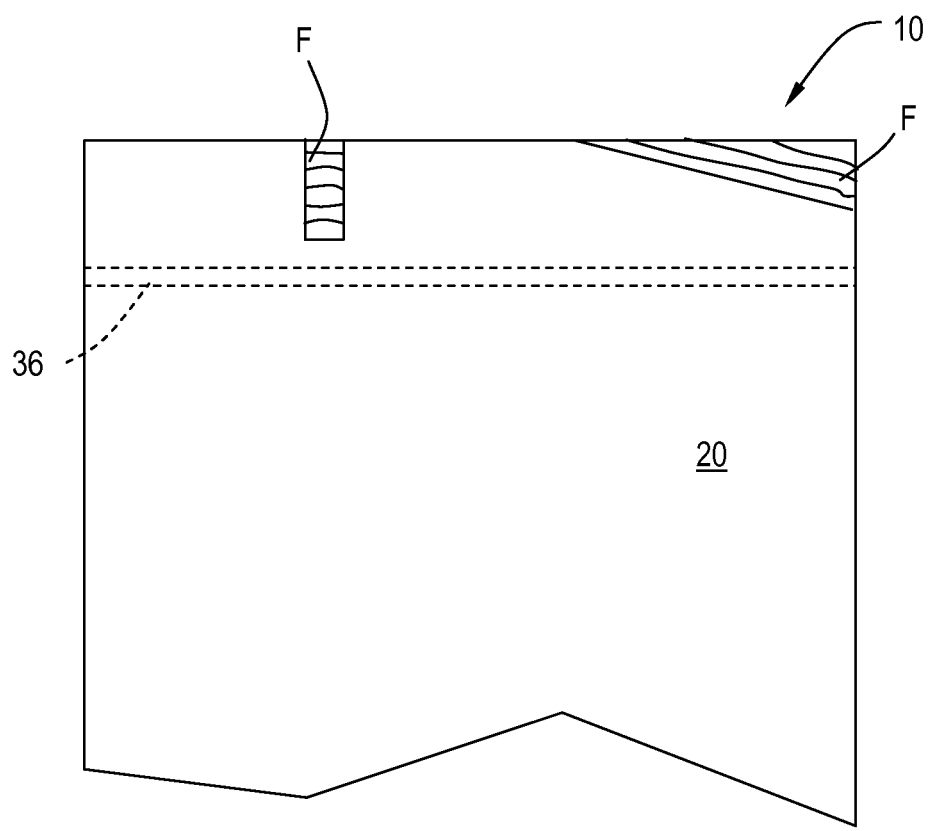
FIG. 5 is a schematic, side elevational view of a portion of the turbine blade of FIG. 4 after a weld deposition step.

As shown in FIG. 5, the laser welding process results in a solidified weld fill "F" metallurgically bonded to the tip wall 34 at the location of each defect. With proper control of the process parameters, this process produces the same crystallographic orientation in the weld fill F (e.g. single crystal) as that of the remainder of the airfoil 18. Once the laser welding process is finished, the weld fill F may be further formed by known processes of machining, grinding, coating, etc. to bring the tip wall 34 back to the original dimensions and condition.

The method described above increases repaired tip service life by increasing the oxidation resistance of the tip by compositional change. In other words the new tip material that is laser deposited has superior oxidation resistance to that of the base metal. This makes the repaired tip structure resistant to "burning away" in service. Furthermore, the laser weld repaired tip with its single crystal microstructure will provide better resistance to thermal fatigue cracking when compared to a polycrystalline weld microstructure produced with a prior art arc welding process.

The foregoing has described a method for repairing gas turbine engine airfoils and tip structures. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A method for depositing material on a turbine airfoil, wherein the turbine airfoil comprises a tip wall extending past a tip cap, and wherein the tip wall comprises a first alloy with a single crystal microstructure, the method comprising:
   depositing a second alloy on the tip wall by laser fusing the second alloy to form a repair structure, wherein a high temperature oxidation resistance of the second alloy is greater than a high temperature oxidation resistance of the first alloy; and
   controlling a pulse frequency of the laser at a frequency of 5 Hz, a duty cycle of the laser, a power of the laser to between about 50 W and about 1200 W, a wavelength of the laser to between about 0.01 to about 100 microns, a translation speed of the laser to between about 0.01 cm/s to about 100 cm/s, and a feed rate of the second alloy between about 0.1 g/min to about 10 g/min so that the repair structure has a single crystal microstructure that is substantially the same as the single crystal microstructure of the tip wall.

2. The method of claim 1, further comprising performing a surface preparation process to the tip wall prior to depositing the second alloy.

3. The method of claim 1, further comprising removing a portion of the tip wall prior to depositing the second alloy.

4. The method of claim 3, wherein removing the portion of the tip wall forms a void in the tip wall, and depositing the second alloy in the void forms the repair structure.

5. The method of claim 3, wherein removing the portion of the tip wall comprises machining at least one defect present in the tip wall.

6. The method of claim 1, wherein depositing the second alloy comprises applying a powder of the second alloy to the tip wall, and applying the laser to the powder to consolidate the powder to form the repair structure.

7. The method of claim 6, further comprising removing a portion of the tip wall to form a void in the tip wall, and wherein depositing the second alloy comprises:
   introducing the powder into the void;
   using the laser to sinter an exposed layer of the powder; and
   repeating the introducing and sintering until the repair structure is complete.

8. The method of claim 6, further comprising removing a portion of the tip wall to form a void in the tip wall, and wherein depositing the second alloy comprises:
   using the laser to melt the powder;
   depositing the molten powder into the void; and
   allowing the molten powder to cool and solidify to form the repair structure.

9. The method of claim 6, further comprising removing a portion of the tip wall to form a void in the tip wall, and wherein depositing the second alloy comprises:
feeding a filler wire comprising the second alloy in a vicinity of the void, and applying the laser to the filler wire to clad the filler wire to the tip wall.

10. A method for forming a tip wall on a turbine airfoil, wherein the turbine airfoil comprises a tip cap, and wherein the airfoil comprises a first alloy with a single crystal microstructure, the method comprising:
depositing a second alloy on the tip cap by laser fusing the second alloy to form a tip wall, wherein a high temperature oxidation resistance of the second alloy is greater than a high temperature oxidation resistance of the first alloy; and
controlling a pulse frequency of the laser at a frequency of 5 Hz, a duty cycle of the laser, a power of the laser to between about 50 W and about 1200 W, a wavelength of the laser to between about 0.01 to about 100 microns, a translation speed of the laser to between about 0.01 cm/s to about 100 cm/s, and a feed rate of the second alloy between about 0.1 g/min to about 10 g/min so that the tip wall has a single crystal microstructure that is substantially the same as the single crystal microstructure of the turbine airfoil.

11. The method of claim 10, wherein depositing the second alloy comprises applying a powder of the second alloy to the tip cap, and applying the laser to the powder to consolidate the powder to form the tip wall.

12. The method of claim 11, wherein depositing the second alloy further comprises:
using the laser to sinter an exposed layer of the powder; and
repeating the applying of powder and sintering to build up the tip wall.

13. The method of claim 11, wherein depositing the second alloy comprises:
feeding a filler wire comprising the second alloy in a vicinity of the tip cap, and
applying the laser to the filler wire to clad the filler wire to the tip cap to build up the tip wall.

* * * * *